United States Patent [19]

Takigawa

[11] Patent Number: 4,846,629
[45] Date of Patent: Jul. 11, 1989

[54] BLADES FOR HIGH SPEED PROPELLER FAN

[75] Inventor: Kazunori Takigawa, Numazu, Japan

[73] Assignee: Usui Kokusai Sangyo Kabushiki Kaisha, Nagawasa, Japan

[21] Appl. No.: 219,390

[22] Filed: Jul. 15, 1988

Related U.S. Application Data

[63] Continuation of Ser. No. 133,951, Dec. 17, 1987, abandoned, which is a continuation of Ser. No. 27,652, Mar. 19, 1987, abandoned.

[30] Foreign Application Priority Data

May 19, 1986 [JP] Japan .............................. 61-75109[U]
May 19, 1986 [JP] Japan .............................. 61-75110[U]

[51] Int. Cl.$^4$ .............................................. B65H 1/26
[52] U.S. Cl. ................................ 416/223 R; 416/235; 416/236 R; 415/119
[58] Field of Search ............... 416/235, 223 A, 223 B, 416/223 R, 231 R, 236 A, 236 R; 415/119; 181/206; 354/309; 355/30

[56] References Cited

U.S. PATENT DOCUMENTS 573,562 12/1896 Wittram .............................. 416/235
978,677 12/1910 Taylor .............................. 416/236 R

FOREIGN PATENT DOCUMENTS 372378 5/1932 United Kingdom ................ 416/236
580806 9/1946 United Kingdom ................ 416/235

Primary Examiner—Robert E. Garrett
Assistant Examiner—Therese M. Newholm
Attorney, Agent, or Firm—Anthony J. Casella; Gerald E. Hespos

[57] ABSTRACT

Each blade of a high speed propeller fan extended radially outwardly from a member connected to a rotating body has a coarsened surface at least part of its suction side. The coarsened surface has a coarsened density or depth which gradually increases from the rear edge of the blade to its front edge.

7 Claims, 3 Drawing Sheets

BLADES FOR HIGH SPEED PROPELLER FAN

This application is a continuation of application Ser. No. 133,951 filed on Dec. 17, 1987, now abandoned which in turn was a continuation of application Ser. No. 027,652, which was filed on Mar. 19, 1987, now abandoned.

RELATED APPLICATIONS

This appication is related to U.S. patent application Ser. No. 07/219,316 entitled "BLADES FOR PROPELLER FAN" and U.S. patent application 07/219,452 entitled "BLADES FOR LOW SPEED PROPELLER FAN", both of which were filed on the same day as the subject application.

BACKGROUND OF THE INVENTION

1. Field of the Invention

This invention relates to blades for the propeller fan which is driven at a relatively high speed for supplying air to automobile engines or other kinds of apparatus for cooling or other purposes, and which is made of, for example, a synthetic resin or metal.

2. Description of the Prior Art

A known propeller fan is partly shown in FIG. 6 or 7 by way of example. Both of the fans comprise a plurality of blades 12 projecting radially outwardly from the outer peripheral surface of an annular boss 11. Each blade 12 of the fan shown in FIG. 6 has a multiplicity of small apertures 24 formed therethrough between its longitudinally central portion and its rear edge 13. The apertures 14 allow air to flow therethrough and thereby reduce a difference of air pressure between the suction and delivery sides of each blade 13 in order to decrease the separation of air in a boundary layer from the surface of the blade on its suction side and thereby the noise of the fan. Each blade 12 of the fan shown in FIG. 7 has along its rear edge 13 a plurality of notches 15 which are provided for preventing the appearance of a large swirling flow of air in the vicintiy of the rear edge 15 to reduce the noise of the fan.

The propeller fan produces a bigger noise as it is driven at a higher speed. The noise is mainly caused by the sound of the separating air, the sound of the flowing air and the sound of the pitching air. The sound of the separating air is due to the appearance of a swirling flow of air as a result of the separation of air in the boundary layer from the surface of each blade on its suction side. There exist two flows of air along the surface of each blade on its suction side, i.e, a flow of air in an outer layer having a substantially constantly high velocity and a large amount of kinetic energy and a flow of air in an inner or boundary layer contacting the blade surface and having a low velocity and a small amount of kinetic energy which is due to the viscosity of air. The boundary layer has a thickness which increases with an increase in air velocity. The boundary layer grows and increases its thickness toward the rear edge of the blade until it is eventually separated from the blade surface to form a swirling flow of air.

Neither of the blade constructions shown in FIGS. 6 and 7 is very effective for reducing the noise of the fan including the sound of the separating air. Moreover, the presence of the apertures or notches lowers the air supplying capacity of the fan, as well as the mechanical strength of the blades per se.

SUMMARY OF THE INVENTION

The inventor of this invention has experimentally discovered that if each blade has a finely coarsened surface on its suction side, it can agitate the air in the boundary layer having only a small amount of kinetic energy and thereby form a finely divided swirling flow of air which is mixed with the air in the outer layer having a large amount of kinetic energy to impart a large amount of kinetic energy to the boundary layer and reduce its thickness, so that the separation of the boundary layer from the blade surface may be prevented or at least delayed.

It is, therefore, an object of this invention to provide blades for a high speed propeller fan which can effectively overcome the drawbacks of the prior art as hereinbefore pointed out.

In a propeller fan having a relatively high rotating speed, the boundary layer of air which extends along the surface of each blade on its suction side has a large thickness even in the vicinity of the front edge of the blade and the amount of its kinetic energy is greatly different from that of the air in the outer layer. The boundary layer easily grow and increases its thickness. It is easily separated from the blade surface especially in the vicinity of its rear edge and forms a swirling flow of air which easily grows especially in the vicinity of the rear edge of the blade. According to this invention, therefore, each blade has on its suction side an at least partly coarsened surface having a coarsened density or depth which gradually increases from the rear edge of the blade to its front edge. The term "rear edge" as herein used means the trailing edge which the blade presents when it is rotated and the "front edge" is, therefore, the opposite edge. The coarsened surface can minimize the appearance of a large swirling flow of air otherwise resulting from the separation of the boundary layer and thereby reduce the noise of the fan without lowering appreciably its air supplying capacity or the mechanical strength of the blade per se.

This invention essentially consists in a high speed propeller fan which includes a member connected a rotating body and a plurality of blades extended radially outwardly from the outer peripheral surface of the member, each of the blades characterized by having a coarsened surface at least part of its suction side, the coarseness of the surface gradually increasing from the rear edge of the blade to its front edge. The coarsened surface is a grooved surface of a roughened surface or a combination thereof.

DETAILED DESCRIPTION OF THE INVENTION

Figure 1:
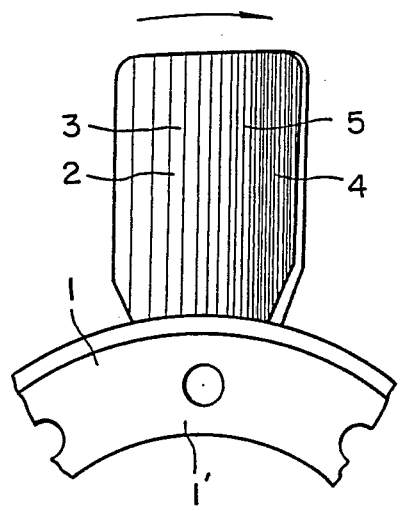
FIG. 1 is a fragmentary front elevational view of a high speed propeller fan embodying this invention.
Figure 2:
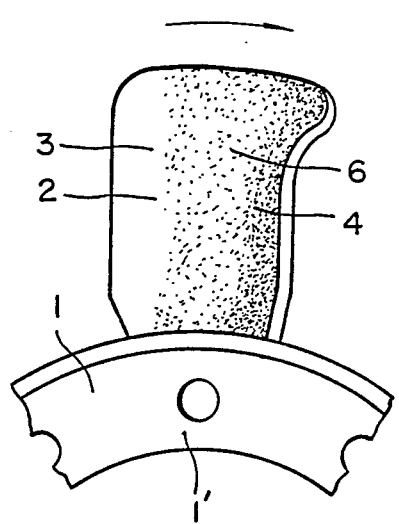
FIG. 2 is a view similar to FIG. 1, but showing another embodiment of this invention.
Figure 3:
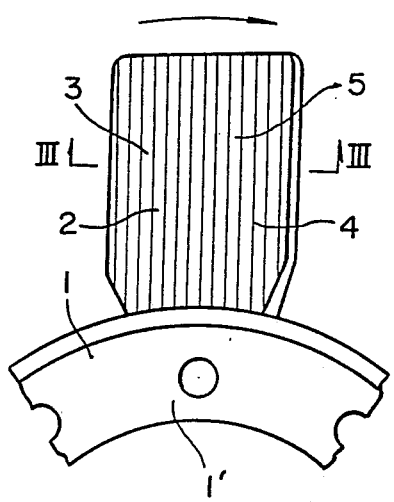
FIG. 3 is a view similar to FIG. 1, but showing still another embodiment.
Figure 3A:
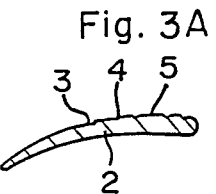
FIG. 3A is a sectional view taken along the line III—III of FIG. 3.
Figure 4:
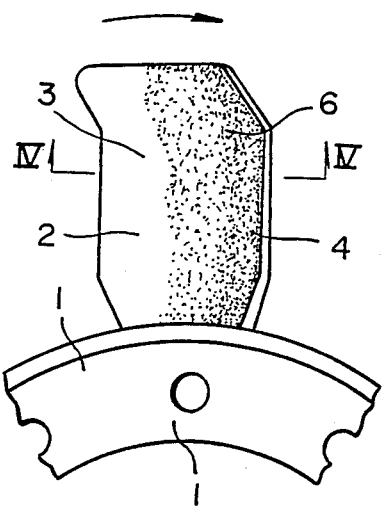
FIG. 4 is a view similar to FIG. 1, but showing a further embodiment of this invention.
Figure 4A:
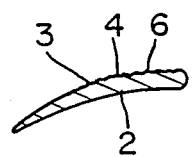
FIG. 4A is a sectional view taken along the line IV—IV of FIG. 4.
Figure 6:
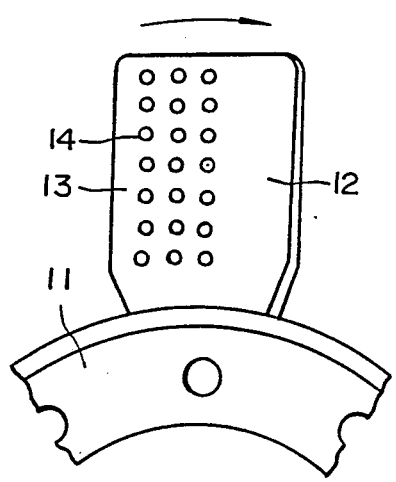
FIG. 6 is a fragmentary front elevational view of a known propeller fan.
Figure 7:
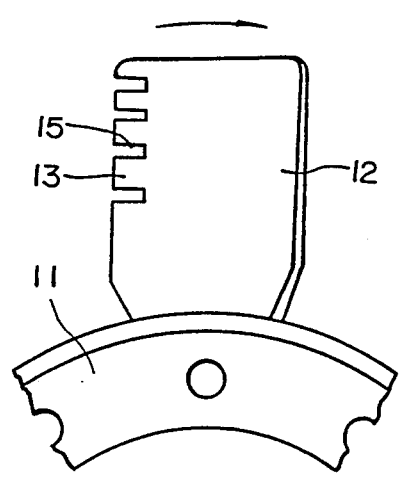
FIG. 7 is a view similar to FIG. 6, but showing another known propeller fan.

Referring to FIGS. 1 to 4, each fan embodying this invention comprises an annular boss 1 having a wall 1' at which it is connected to a rotating body (not shown), and a plurality of blades 2 projecting radially outwardly from the outer peripheral surface of the boss 1. The fan can, for example, be made of a synthetic resin or soft metal such as aluminum or aluminum alloy. Each blade 2 has on its suction side a surface 3 which is at least partly coarsened to form a coarsened surface 4. The coarsened surface 4 has a coarsened density which gradually increases from the rear edge of the blade to its front edge as shown in FIG. 1 or 2, or a coarsened depth which likewise increases as shown in FIGS. 3 and 3A or 4 and 4A. The coarsened surface 4 may be formed by multiplicity of fine grooves 5 as shown in FIG. 1 or 3, or is a roughened surface 6 as shown in FIG. 2 or 4. The grooves 5 may extend in parallel to one another in a substantially regular pattern as shown in FIG. 1 or 3, or may alternatively extend in an irregular pattern or cross one another to form a network pattern. The coarsened surface may alernatively be a combined grooved and roughened surface.

The arrow in each of FIGS. 1 to 4 shows the direction in which the fan is rotated. Therefore, the right-hand longitudinal edge of the blade is its front edge.

The foregoings are the embodiments relating to the propeller fan comprising an annular boss 1 having a mounting wall 1' for connecting the annular boss to a rotating body and a plurality of blades 2 formed integrally with the annular boss.

Figure 5:
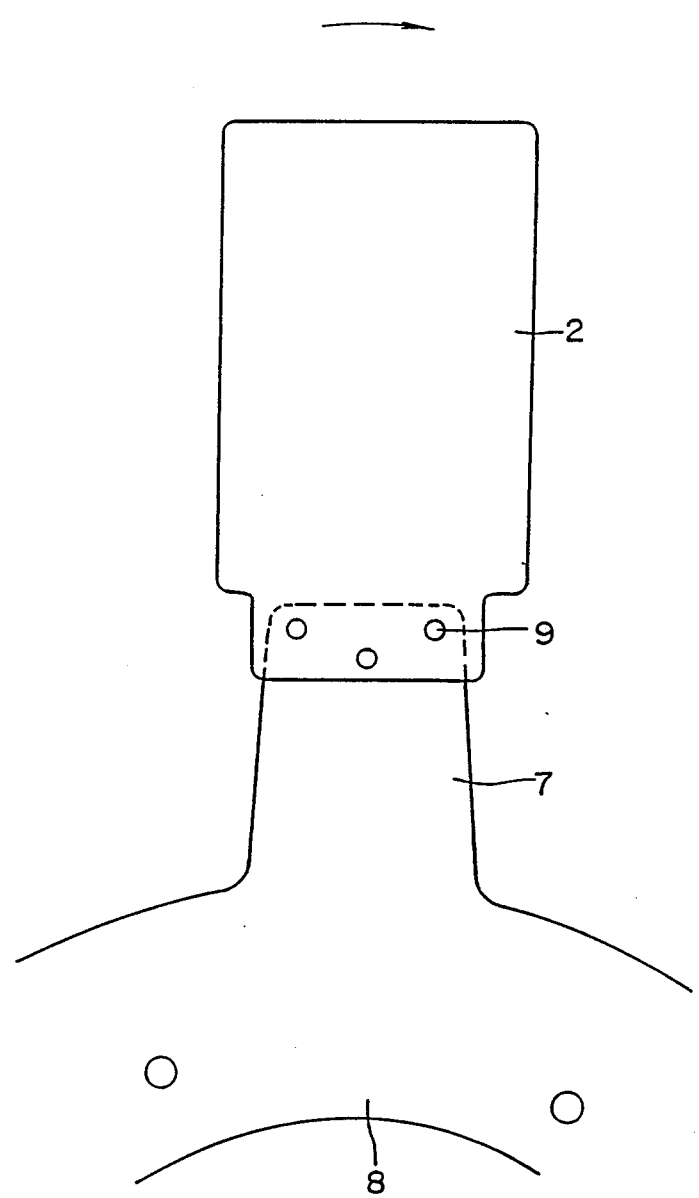
FIG. 5 is a view similar to FIG. 1, but showing a still further embodiment.

The invention is not restricted to such the embodiments as above mentioned. The propeller fan may be constructed with, for example, as shown in FIG. 5, a spider 7 having a mounting wall 8 for connecting the spider to a rotating body and a plurality of blades 2 formed independently of the spider, wherein the blades are fixed to the spider by rivets 9 or likes. In case that the blades are made of a synthetic resin or soft metal, they may be mould to have a blade insert which is to be fixed to the outer periphery of the spider by the rivets or likes. In case that the blades are made of a hard metal such as iron, they may be provided with a coarsened surface which can be formed by rubbing sandpaper or wire brush against the surface coated previously with a paint or coating the surface with a paint mixed with fine particle material or spraying the fine particle material onto the surface which was previously coated with an adhesive agent.

The coarsened surface 4 serves to agitate the air in the boundary layer to form a finely divided swirling flow of air which can effectively be mixed with the air in the outer layer having a larger amount of kinetic energy to give the boundary layer a larger amount of kinetic energy and reduce its thickness so that its separation from the blade surface may be prevented or at least delayed. Since the separation of the boundary layer in a propeller fan rotating at a high speed has a large thickness even in the vicinity of the front edge of each blade and grows to a further extent toward its rear edge near which it is easily separated from the blade surface to form a large swirling flow of air as hereinbefore stated, the coarsened surface 4 has a greater coarsened density or depth in the vicinity of the front edge of the blade than in the vicinity of its rear edge. Therefore, it can effectively prevent the appearance of a large swirling flow of air or divide any large swirling flow finely to thereby reduce the noise of the fan effectively.

Moreover, this invention makes it possible to provide blades for a propeller fan which is easy to manufacture without calling for any essential change in construction of the blade and without lowering its air supplying capacity or the mechanical strength of the blades per se.

What is claimed is:

1. In a high speed propeller fan which includes a member connected to a rotating body and a plurality of blades extending radially outwardly from the outer peripheral surface of said member, each of said blades characterized by having a coarsened surface defined by a plurality of grooves on at least part of its suction side, the coarseness of the surface gradually increasing from the rear edge of said blade, which is its trailing edge when the fan is rotated, to its front edge, said grooves extending generally parallel to the rear edge.

2. A fan as set forth in claim 1, wherein said coarsened surface has a coarsened density which gradually increases from said rear edge to said front edge.

3. A fan as set forth in claim 1, wherein said coarsened surface has a coarsened depth which gradually increases from said rear edge to said front edge.

4. A fan as set forth in claim 1 further comprising a roughening on the suction side of said blades.

5. In a high speed propeller fan which includes a member connected to a rotating body and a plurality of blades extending radially outwardly from the outer peripheral surface of said member, each of said blades being characterized by having a coarsened surface defined by a roughening on at least part of its suction side, the coarseness of the surface gradually increasing from the rear edge of said blade, which is its trailing edge when the fan is rotated, to its front edge.

6. A fan as set forth in claim 5, wherein said coarsened surface has a coarsened density which gradually increases from said front edge to said rear edge.

7. A fan as set forth in claim 5 wherein said coarsened surface has a coarsened depth which gradually increases from said front edge to said rear edge.

* * * * *